United States Patent
Tulabandhula et al.

(10) Patent No.: US 10,176,443 B2
(45) Date of Patent: Jan. 8, 2019

(54) METHOD AND SYSTEM FOR DISPATCHING OF VEHICLES IN A PUBLIC TRANSPORTATION NETWORK

(71) Applicant: Conduent Business Services, LLC, Florham Park, NJ (US)

(72) Inventors: Theja Tulabandhula, Karnataka (IN); Prabuchandran Krithivasan Jayachandran, Bangalore (IN); Tejas Prakash Bodas, Maharashtra (IN)

(73) Assignee: Conduent Business Services, LLC, Florham Park, NJ (US)

( * ) Notice: Subject to any disclaimer, the term of this patent is extended or adjusted under 35 U.S.C. 154(b) by 286 days.

(21) Appl. No.: 15/232,182

(22) Filed: Aug. 9, 2016

(65) Prior Publication Data
US 2018/0046961 A1 Feb. 15, 2018

(51) Int. Cl.
| | | |
|---|---|---|
| *G06Q 10/06* | (2012.01) | |
| *G06N 5/02* | (2006.01) | |
| *G06K 9/00* | (2006.01) | |
| *G06T 7/00* | (2017.01) | |
| *G06K 9/62* | (2006.01) | |

(52) U.S. Cl.
CPC ... *G06Q 10/06315* (2013.01); *G06K 9/00369* (2013.01); *G06K 9/00771* (2013.01); *G06K 9/6297* (2013.01); *G06N 5/022* (2013.01); *G06T 7/0022* (2013.01); *G06K 9/00228* (2013.01)

(58) Field of Classification Search
None
See application file for complete search history.

(56) References Cited

U.S. PATENT DOCUMENTS

| | | | | |
|---|---|---|---|---|
| 2011/0313804 A1* | 12/2011 | Camp | .................... | G06Q 10/02 705/7.13 |
| 2012/0041675 A1* | 2/2012 | Juliver | .................... | G06Q 10/08 701/465 |
| 2016/0027307 A1* | 1/2016 | Abhyanker | ............ | G08G 1/005 701/117 |
| 2016/0335576 A1* | 11/2016 | Peng | ................ | G06Q 10/06315 |

(Continued)

OTHER PUBLICATIONS

I. Osband et al., "(More) Efficient Reinforcement Learning via Posterior Sampling", Dec. 26, 2013.

(Continued)

*Primary Examiner* — Thomas L Mansfield
(74) *Attorney, Agent, or Firm* — Fox Rothschild LLP

(57) ABSTRACT

A system for dispatching vehicles in a public transportation network may include a passenger monitoring system configured to monitor a number of passengers waiting at a stop in the transportation network, a vehicle dispatching system and a processing device. The processing device may apply a Markov Decision Process (MDP) model to determine a score for each of multiple decision rules, in which each score represents a number of passengers waiting at the stop at the end of a time interval, and use the scores to identify a number of waiting passengers at which a reserve vehicle should be dispatched. The system may use information received from the passenger monitoring system to determine a state at an instant of time, and determine whether a reserve vehicle should be dispatched based on the MDP model and cause the vehicle dispatch system to dispatch a reserve vehicle or retain a nominal vehicle.

20 Claims, 10 Drawing Sheets

(56) References Cited

U.S. PATENT DOCUMENTS

2017/0059336 A1\* 3/2017 Huang ................... G01C 21/34
2017/0277191 A1\* 9/2017 Fairfield ............... H04W 4/029
2018/0075380 A1\* 3/2018 Perl .................... G06Q 10/0635

OTHER PUBLICATIONS

T. Jaksch et al., "Near-optimal Regret Bounds for Reinforcement Leaning", Journal of Machine Learning Research 11 (2010), pp. 1563-1600, Submitted Jul. 2009, Revised Nov. 2009, Published Apr. 2010.
K. Xu et al., "Using Future Information to Reduce Waiting Times in the Emergency Department via Diversion", Oct. 14, 2015.

\* cited by examiner

1: Input: $T, \Pi = \{\pi_k : k = 1, \ldots, K\}, \{\beta(t)\}_{t=1}^{T}, S_{start}, \tau$
2: Output: $CR_T$ (Cumulative reward in $T$ rounds)
3: Initialization
4: for $k = 1$ to $K$ do
5:    $\hat{\rho}(k) = 1$
6:    $n(k) = 0$
7:    $R_{arm}(k) = 0$ (Running sum of rewards for policy $\pi_k$)
8:    $T_{arm}(k) = 0$ (Running sum of number of rounds for policy $\pi_k$)
9: end for
10: $S = S_{next}, t' = 0, r = 0$
11: $k \sim rand(1, K)$
12: Execution
13: for $t = 1$ to $T$ do
14:    if $(t \neq 1$ and $S = S_{start})$ or $t' \geq \tau$ then
15:      $R_{arm}(k) = R_{arm}(k) + r$
16:      $T_{arm}(k) = T_{arm}(k) + t'$
17:      $\hat{\rho}(k) = \dfrac{R_{arm}(k)}{T_{arm}(k)}$
18:      $c(k) = \beta(t)\sqrt{\dfrac{2 \log t}{n(k)}}$
19:      $n(k) = n(k) + 1$
20:      $k = \arg\max_{j=1,\ldots,K} \{\hat{\rho}(j) + c(j)\}$
21:      $t' = 0, r = 0$
22:    end if
23:    $S_{next} \sim P^{True}(\cdot \mid s, \pi_k(s))$
24:    $r = r + R^{True}(s, a, s_{next})$
25:    $t' = t' + 1$
26:    $S = S_{next}$
27: end for
28: $CR_T = \sum_{j=1}^{K} R_{arm}(j)$

FIG. 6

1: Input: $T, \Pi = \{\pi_k : k = 1, \ldots, K\}, S_{start}, \tau$
2: Output: $CR_T$ (Cumulative reward in $T$ rounds)
3: Initialization
4:   $CR_T = 0$
5:   for $k = 1$ to $K$ do
6:     $S(k) = 0, F(K) = 0$
7:   end for
8:   $s = S_{start}, t' = 0, r = 0$
9:   $k \sim \text{rand}(1, K)$
10: Execution
11:   for $t = 1$ to $T$ do
12:     if $(t \ne 1$ and $s = S_{start})$ or $t' \ge \tau$ then
13:       $CR_T = CR_T + r$
14:       $S(k) = S(k) + r$
15:       $F(k) = F(k) + t' - r$
16:       for $k = 1$ to $k$ do
17:         $\theta(k) \sim \text{Beta}(S(k), F(k))$
18:       end for
19:       $k = \arg\max_{j=1,\ldots,K} \{\theta(j)\}$
20:       $t' = 0, r = 0$
21:     end if
22:     $S_{next} \sim P^{True}(\cdot \mid s, \pi_k(s))$
23:     $r = r + R^{True}(s, a, S_{next})$
24:     $t' = t' + 1$
25:     $s = S_{next}$
26:   end for

FIG. 7

1: INPUT: $T$, $\Pi = \{\pi_k : k = 1, \ldots, K\}$, $S_{start}$, $\tau$, $T_{switch}$, $\{\beta(t)\}_{t=1}^{T_{switch}}$, Alg = pUCB-Extended OR pThompson-Extended 2: OUTPUT: $CR_T$ (Cumulative reward in $T$ rounds)

3: EXECUTION

4: $(CR_1, \hat{P}, \hat{R}) = \text{Alg}(T_{switch}, \Pi, \{\beta(t)\}, S_{start}, \tau)$ 5: $CR_2 = \text{PSRL}(T - T_{switch}, \tau, \hat{P}, \hat{R}, S_{start})$

METHOD AND SYSTEM FOR DISPATCHING OF VEHICLES IN A PUBLIC TRANSPORTATION NETWORK

BACKGROUND

This disclosure relates to methods and systems for dispatching vehicles in a public transportation network.

The Reinforcement Learning (RL) framework has promised to bring solutions to several applications such as slow server problems where arriving customers wait in a queue before obtaining service (e.g. call center operations, web server load balancing etc.), machine replacement problems in inventory management, and river swim problems where an agent needs to swim left or right in a stream. A recent goal in the RL framework is to choose a sequence of actions or a policy to maximize the reward collected or minimize the regret incurred in a finite time horizon. For several RL problems in operation research and optimal control, the optimal policy of an underlying Markov Decision Process (MDP) is characterized by a known structure. The current state of the art does not utilize this known structure of the optimal policy while minimizing the regret. Other systems attempt to optimize long range average reward, which has been previously shown to be disadvantageous in some scenarios to algorithms that minimize regret. In other RL systems, the transition probabilities and reward values are not known a priori, making it harder to compute a decision rule.

This document describes devices and methods that are intended to address at least some issues discussed above and/or other issues.

SUMMARY

In an embodiment, a system for dispatching vehicles in a public transportation system may include a passenger monitoring system that includes a circuit configured to monitor a number of passengers waiting at a stop in the public transportation network; a vehicle dispatching system; a processing device communicatively coupled to the circuit; and a non-transitory computer readable medium in communication with the processing device.

In an embodiment, the passenger monitoring system may be positioned at a stop in the transportation network, and the circuit in the passenger monitoring system is capable of detecting a number of passengers who are waiting at the stop at any given time. Examples of suitable hardware include a camera positioned at the stop and having a lens focused on a waiting area, and a computing device with image processing software that is capable of analyzing digital images of the waiting area, recognizing people that are in each image, and counting a number of people in each image. Each image will be associated with a time of capture so that the system can determine a number of passengers who are waiting at the stop at any given time. Other suitable hardware includes a token and token reader.

In an embodiment, the processing device may be connected to a transceiver and also connected to one or more communication networks to receive data from the passenger monitoring system and transmit determinations to a vehicle dispatching system. The non-transitory, computer readable medium may contain programming instructions that enable the processing device to analyze data received from the passenger monitoring system, and determine when a reserve vehicle should be dispatched to the stop.

In an embodiment, the vehicle dispatching system may include a processor and programming instructions configured to generate commands to release a vehicle to a particular stop. The vehicle dispatching system may also include a transceiver that is connected to a communication network that transmits the commands to various vehicles in the transportation system's fleet. The vehicle dispatching system may also be connected to a communication network that enables it to receive commands from the processing device.

In an embodiment, the computer readable medium may store one or more programming instructions for causing the processing device to apply a Markov Decision Process model by: (i) identifying a plurality of states of the public transportation network, in which each state comprises a time interval and a number of passengers waiting at the stop in the time interval, (ii) identifying a plurality of decision rules, wherein each decision rule is indicative of whether to dispatch a reserve vehicle or to keep a nominal vehicle during any of the states, (iii) applying the decision rules to a plurality of states and determining a score for each of the decision rules, in which each score represents a number of passengers waiting at the stop at the end of the time interval for the state to which the decision rule is applied, and (iv) using the scores to identify a number of waiting passengers at which a reserve vehicle should be dispatched during a future time interval. The system may use information received from the circuit to determine a state at an instant of time; determine whether a reserve vehicle should be dispatched after the instant of time by applying the Markov Decision Process model to the determined state; and cause the vehicle dispatch system to dispatch a reserve vehicle after the instant of time if the Markov Decision Process model for the determined state indicates that a reserve vehicle be dispatched, otherwise cause the vehicle dispatch system to retain a nominal vehicle without dispatching a reserve vehicle.

As another option, the system may include a token reader that is positioned at the stop and connected to the circuit, along with additional programming instructions that are configured to cause the processing device to receive, from the token reader, a measured indication of a number of passengers who bore tokens and who passed within a detectable communication range of a receiver of the token reader.

The instructions to apply the decision rules to a plurality of states and determine the scores for each of the decision rules may comprise instructions to: (i) identify a transition probability matrix indicative of probabilities between state transitions; (ii) identify a reward matrix indicative of rewards between state transitions; and (iii) update the Markov Decision Process model using the monitored number of passengers waiting at the stop during a plurality of time intervals to maximize an average reward over that time interval. The instructions to determine a score for each of the decision rules may comprise instructions to determine a running sum of a group of rewards for each decision rule over a plurality of time periods, where each of the group of rewards is indicative of a reduction in the number of passengers waiting at the stop when each decision rule is applied. Alternatively, the instructions to determine a score for each of the decision rules may comprise instructions to determine a cumulative reward for each decision rule over a plurality of time periods.

BRIEF DESCRIPTION OF THE DRAWINGS

FIG. 6 depicts a pseudo code to illustrate the steps of applying a pUCB algorithm according to one embodiment.

FIG. 7 depicts a pseudo code to illustrate the steps of applying a pThompson algorithm according to one embodiment.

FIG. 8 depicts a pseudo code to illustrate the steps of applying a warmPSRL algorithm according to one embodiment.

DETAILED DESCRIPTION

Figure 1:
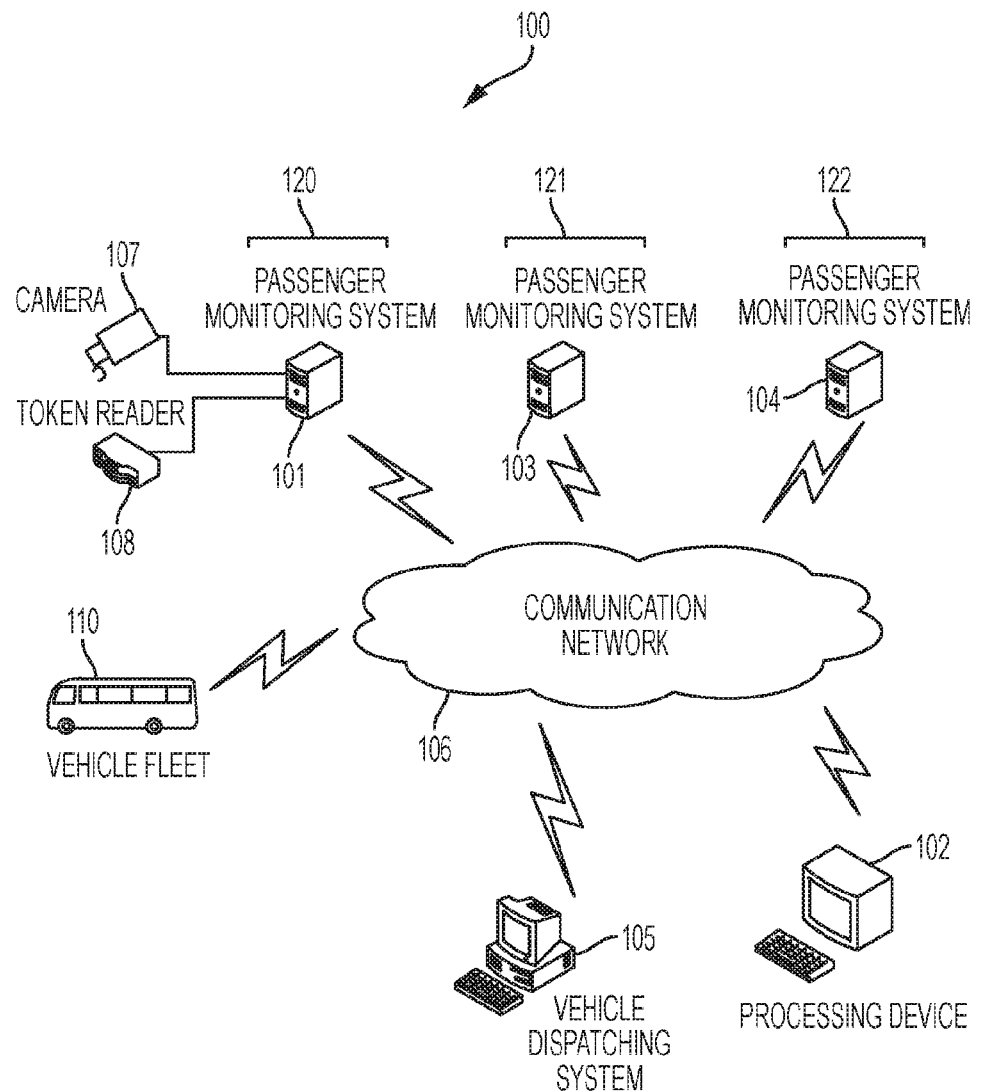
FIG. 1 depicts an example of a vehicle dispatching system in a public transportation system.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

The terms "memory," "computer-readable medium" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

Each of the terms "camera," "video capture module," "imaging device," "image sensing device" or "imaging sensor" refers to a software application and/or the image sensing hardware of an electronic device that is capable of optically viewing a scene and converting an interpretation of that scene into electronic signals so that the interpretation is saved to a digital video file comprising a series of images.

The term "token" refers to a physical device bearing a unique credential that is stored on the device in a format that can be automatically read by a token reading device when the token is presented to the token reading device. Examples of tokens include transaction cards (such as credit cards, debit cards, transportation system fare cards and the like), healthcare system identification cards, mobile electronic devices such as smartphones, radio frequency identification (RFID) tags, and other devices that are configured to share data with an external reader. The token reader may include a transceiver for receiving data from a transmitter of the token, a sensor that can sense when the token has been positioned in or near the reader, or a communications port that detects when the token has been inserted into the reader.

Each of the terms "reinforcement learning," "regret," "reward" and "Markov Decision Process" refer to corresponding terms that are known within the field of machine learning.

The term "PSRL" refers to the reinforcement learning method published by I. Osband, D. Russo, and B. Van Roy, (More) efficient reinforcement learning via posterior sampling, Advances in Neural Information Processing Systems, pages 3003-3011, 2013.

The term "UCRL" refers to the reinforcement learning method published by T. Jaksch, R. Ortner, and P. Auer, Near-optimal regret bounds for reinforcement learning, The Journal of Machine Learning Research, 11:1563-1600, 2010.

The term "pUCB" refers to the "policy Upper Confidence Bound" algorithm, "pThompson" refers to the "policy Thompson" sampling algorithm, and "warmPSRL" refers to the "warmstarted Posterior Sampling" algorithm, all in the field of reinforcement learning.

With reference to FIG. 1, a system 100 for dispatching vehicles in a public transportation system includes one or more passenger monitoring systems 101, 103, 104, where each monitoring system is installed at a stop 120-122 in the transportation network, and configured to collect monitored data about the stop. The monitoring system may be communicatively connected to the communication network 106 to be able to send the monitored data to or receive commands from other devices on the communication network. The stop may be a bus stop, a train station or stop, a shuttle stop, or any other designated location where a public transit vehicle picks up passengers. The passenger monitoring system includes hardware and/or circuits capable of detecting a number of passengers who are waiting at the stop at any given time. Examples of suitable hardware include a camera 107 positioned at the stop and having a lens focused on a waiting area, and a computing device with an image processing software that is capable of analyzing a sequence of digital images of the waiting area, recognizing people who are in each image, and counting the number of people in each image. For example, the system may use a face recognition technique to recognize human faces in an image and counting the number of recognized human faces in the image. In another example, the system may be able to track the movement of human heads, e.g. by recognizing human hair, ears or other recognizable features of a human head, and count the number of recognized human heads in the image. Each image will be associated with a time of capture so that the system can determine the number of passengers who are waiting at the stop at any given time.

Alternatively and/or additionally, the system may apply object tracking techniques to a sequence of video frames of the stop and track the number of passengers waiting at the stop based on the sequence of video frames. For example, once a passenger enters into the stop, the system may apply multi-object tracking techniques. As passengers move to advance the position in a queue, or move around the premises of the stop while waiting for the transportation vehicle, the system can track multiple passengers along with each of the passengers' movement and determine the number of passengers at any given time.

The passenger monitoring system may alternatively or additionally include a token reader 108. In one embodiment, the token reader may include a data reading circuit that is capable of reading data off of the token. In one embodiment, the token reader may include a detecting circuit capable of detecting a subject within a communication range, such as RFID detector. The token reader may also include a processing device, and program instructions that are stored on a non-transitory computer-readable medium and when executed, can cause the computing device to receive the data from the data reading or detecting circuit. In one embodiment, the computing device may receive a measured indication of the number of passengers who use tokens or may include a transceiver for receiving data from a transmitter of the token, a sensor that can sense when the token has been positioned in or near the reader, or a communication port that detects when the token has been inserted into the reader.

The system may also include a vehicle dispatching system 105, a processing device 102 and a non-transitory, computer readable medium containing programming instructions that enable the processing device to receive data from the passenger monitoring system 101, 103, 104 via the communication network 106, wired or wirelessly, analyze the data and determine whether to dispatch a reserve vehicle to the stop or whether to keep using the nominal vehicle, such as a regular bus in a bus transportation network. The processing device is also communicatively connected to the communication network 106 to transmit determinations to the vehicle dispatching system 105.

The vehicle dispatching system 105 may include a processor that can be programmed to generate commands to release a reserve vehicle to a particular stop. The vehicle dispatching system may include a transceiver and is communicatively connected to a communication network 106 that transmits the commands to various vehicles in the transportation system's fleet 110. The vehicle dispatching system may also be communicatively connected to the communication network 106 to send and receive commands to and from the processing device 102.

Figure 2:
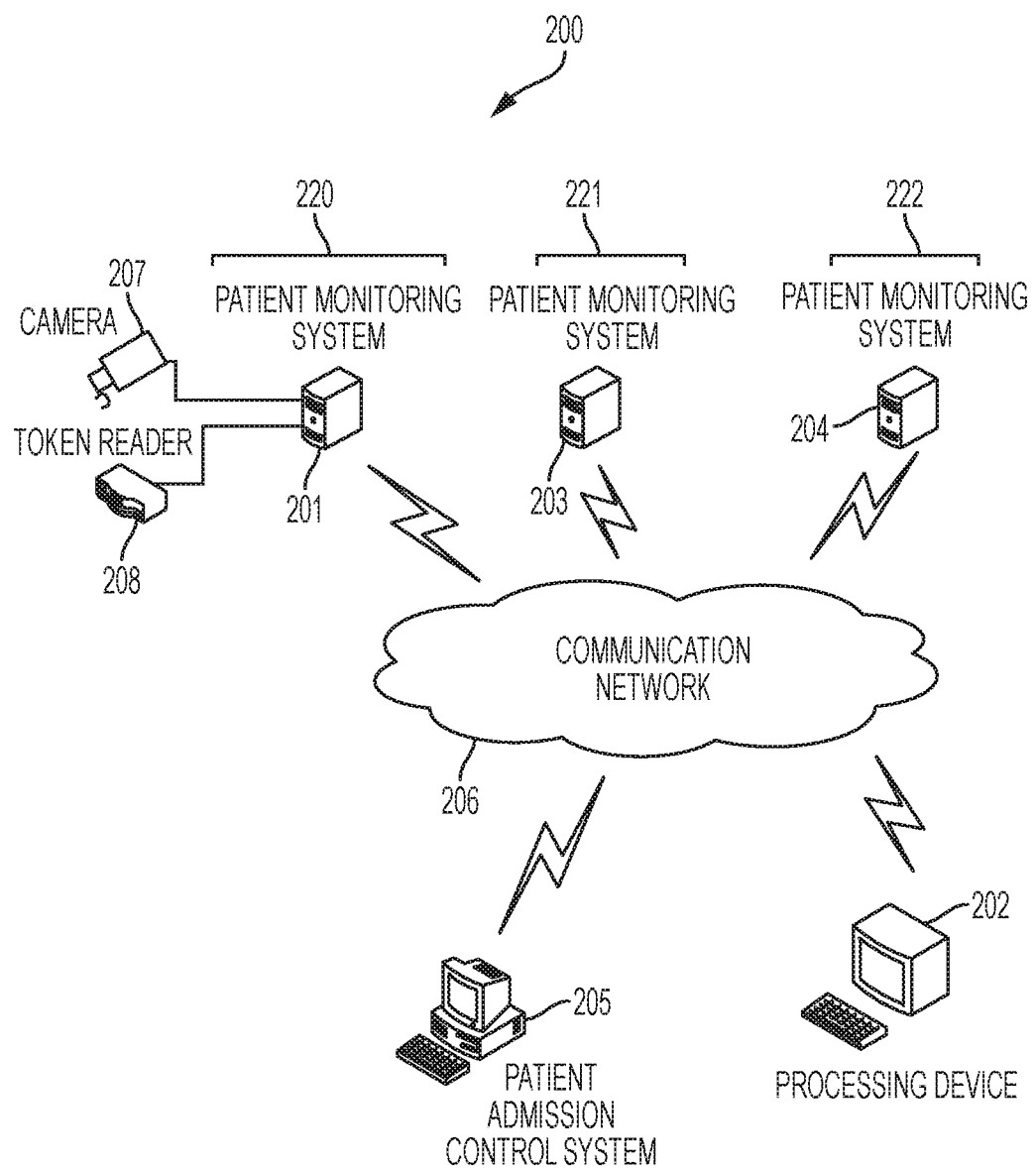
FIG. 2 depicts an example of a patient admission control system in a healthcare network.

With reference to FIG. 2, a system 200 for patient admission control in a healthcare network may include one or more patient monitoring systems 201, 203, 204, where each monitoring system is installed at a healthcare facility 220-222 in the healthcare network, and configured to collect monitored data about each facility. The patient monitoring system may be communicatively connected to the communication network 206 to send the monitored data to or receive commands from other devices on the communication network. The healthcare facility may be an emergency room facility, an urgent care center, a hospital or a physician's office, or any healthcare facility where a patient is to be admitted and treated. The patient monitoring system may include hardware capable of detecting the number of patients who are waiting at the healthcare facility to be treated at any given time.

Examples of suitable hardware include a camera 207 positioned at the facility waiting area and having a lens focused on a waiting area, and a computing device with image processing software. As patients who are waiting to be treated tend to be still and wait in their seats before being called, in one embodiment, the computing device is capable of analyzing digital images of the waiting area, recognizing people that are in each image, and counting the number of people in each image. Each image will be associated with a time of capture so that the system can determine the number of patients who are waiting at the facility at any given time.

Alternatively and/or additionally, the system may have prior knowledge about the layout of the waiting room and/or the seating arrangement. In one embodiment, the system may be designed to analyze whether there is anyone occupying any of the seats in the waiting area, and determine the number of patients waiting at any given time by calculating the number of seats that are occupied.

The patient monitoring system may alternatively or additionally include a token reader 208, such as hospital sign-in or check-in system or an insurance card reader or scanner. In one embodiment, the token reader may include a data reading circuit that is capable of reading data off of the token or insurance card. In one embodiment, the token reader may also include a detecting circuit capable of detecting a subject within a communication range, such as a RFID detector. The token reader may also include a processing device and program instructions that are stored on a non-transitory computer-readable medium and when executed, can cause the computing device to receive the data off of the data reading or detecting circuit. In one embodiment, the computing device may receive a measured indication of the number of patients who has been checked in or may include a transceiver for receiving data from a transmitter of the token, a sensor that can sense when the token has been positioned in or near the reader via a near-field communication such as NFC, RFID, Bluetooth, or a communication port that detects when the token has been inserted into the reader.

The system may also include a processing device 202, a patient admission control system 205, and a non-transitory, computer readable medium containing programming instructions that enable the processing device to receive data from the passenger monitoring system 201, 203, 204 via the communication network 206, analyze the data and determine whether to direct a waiting patient to a remote healthcare facility after any instant of time or keep the patient to continue waiting at the original facility at which the patient is checked in. The processing device may also be communicatively connected to the communication network 206 to receive data and transmit determinations to the patient admission control system 205.

The patient admission control system 205 may include a processor that can be programmed to generate commands to direct a patient to a particular facility. The patient admission control system may include a transceiver and may be communicatively connected to a communication network 206 that transmits the commands to various healthcare facilities 220, 221, 222 in the healthcare network. The patient admission control system can also be communicatively connected to the communication network 206 to send and receive commands to and from the processing device 202.

Figure 3:
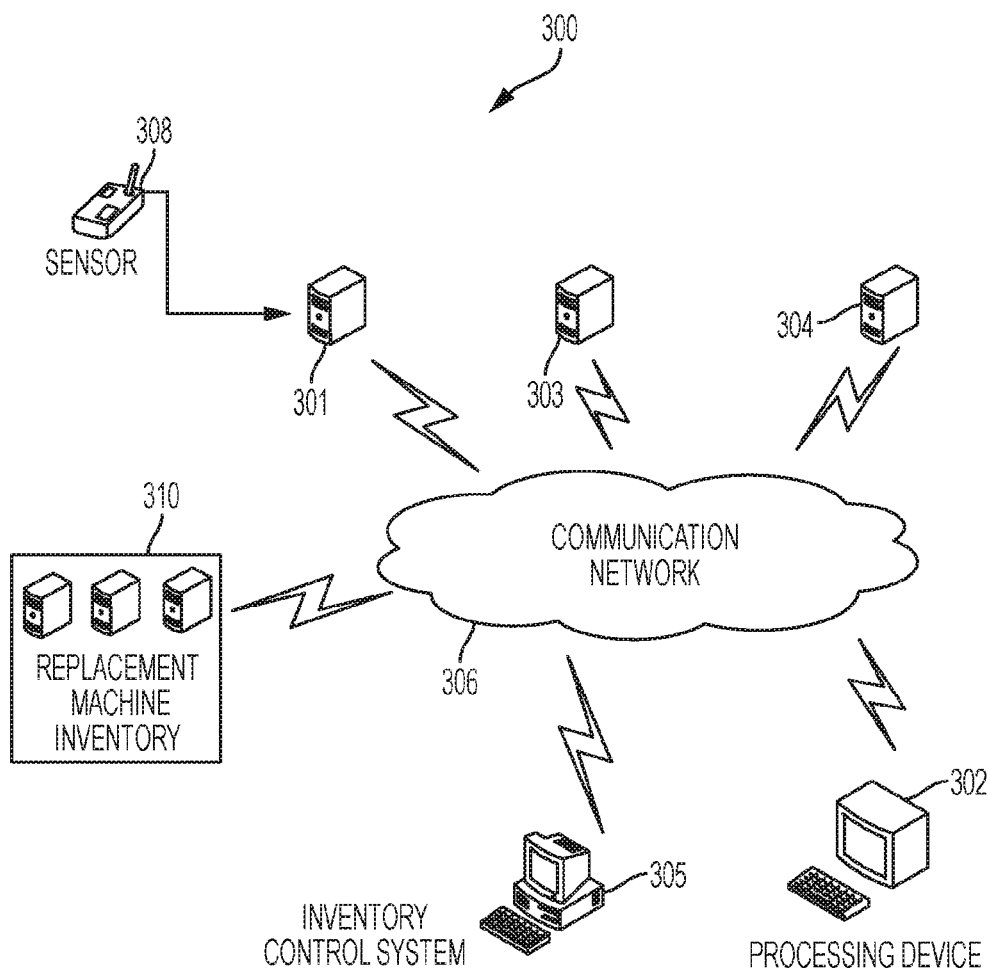
FIG. 3 depicts an example of inventory control management system in a system of machines.

With reference to FIG. 3, a system 300 for inventory control management in a system of machines may include one or more machines 301, 303, 304 operating at the same time. The system of machines may be a factory workshop, an assembly or production line, a computer server room or any facility that hosts multiple machines that operate at the same time. The system of machines may also be a facility that includes multiple assets, such as vehicles, parking systems, tolling system or other infrastructure as part of a fleet management for transit system. In an alternative embodiment, the system of machines may include one or multiple sites, each hosting one or more machines, and all of the machines at multiple sites are monitored and networked under the control of the inventory control management system 300.

The system 300 may include a monitoring system containing hardware capable of detecting the number of machines that require maintenance at any given time.

Examples of suitable hardware include one or more sensor circuits 308 installed at a facility or communicatively coupled to each of the machines. For example, one or more sensors may be installed at an assembly line with multiple machineries and configured to monitor the operation of each of the machineries in the assembly line and determine whether any of the machineries may need maintenance. In one embodiment, each machine may have one or more states, each having one or more operating parameter values. For example, a machine may have a normal state (when the machine is in perfect condition), a warning state (when the machine requires only routine maintenance such as replenishing consumables and performing tune-ups), a critical state (when the machine requires immediate attention), and a failure state. The sensors may provide readings of values of the operating parameters during the multiple states of the machines. The sensor circuits 308 can be communicatively connected to the communication network 306, to send the sensor data to or receive commands from other devices on the communication network.

The system may also include a processing device 302, an inventory control system 305, and a non-transitory, computer readable medium containing programming instructions that enable the processing device to analyze data received from the sensors and determine whether a replacement machine should be issued for any of the machines in the system of machines after an instant of time interval, or keep the replacement machine in the replacement machine inventory. The processing device may also be connected to a transceiver, which is connected to the communication network 306 to receive data from the sensor circuits 308 and transmit determinations to the inventory control system 305.

The inventory control system 305 may include a processor that can be programmed to generate commands to release a replacement machine from the replacement machine inventory 310 and replace a machine in the system of machines with the replaced replacement machine. The inventory control system may also include a transceiver, which is communicatively connected to the communication network 306 and transmits the commands to the one or more sites of the operation facilities in the system of machines. The inventory control system may also be communicatively connected to the communication network 306 to send and receive commands to and from the processing device 302.

The various systems disclosed in embodiments in FIGS. 1-3 may all apply a Markov Decision Process model for the processing device to make a determination as to whether to dispatch a reserve bus in the public transportation system, whether to direct a patient to a remote healthcare facility, or whether to release a replacement machine to replace a machine in the system of machines. For example, in the public transportation system described in FIG. 1, the system may allocate passengers waiting at a bus stop to a reserve bus (that is slower or is available with some delay) when the number of people waiting to board the bus at a station exceeds a threshold, otherwise allocate passengers to a regular bus.

In one embodiment, the system may determine an optimal threshold such that on average the passengers have the least waiting plus commute time. This threshold is critical in achieving an optimal performance. In one embodiment, an optimal performance can be indicating that the average number of passengers waiting at the stop was minimum when one or more decision rules were applied. If the system calls the reserve bus too late when too many passengers are waiting, then the excess people who are waiting at the stop have to wait a longer time, which is not desirable. On the other hand, if the system calls the reserve bus too early when fewer people are waiting, then people who could have eventually boarded the original bus but now board the reserve bus will experience longer commute time (or delay) because the reserve bus is usually slower than the regular bus, such that the overall waiting and travel time is worsen off.

In some embodiments, in a patient admission control system described in FIG. 2, the system may direct patients to a remote healthcare facility when the number of patients waiting to be admitted at the original facility exceeds a threshold, otherwise direct the patients to be checked in at the original facility where they have initially arrived. The system may determine an optimal threshold such that on average the patients have the least waiting plus transportation time to get to the remote healthcare facility. This threshold is critical in achieving an optimal performance. In one embodiment, an optimal performance can be indicating that the average number of patients waiting to be treated was minimum when one or more decision rules were applied. If the system directs the patients to the remote facility too late when too many patients are waiting, then the excess patients who are waiting have to wait a longer time to be treated, which is not desirable. On the other hand, if the system directs the patients to another facility too early when fewer patients are waiting, then a patient who could have eventually been treated at the original facility but now directed to a remote facility will experience longer delay because of the transportation time needed for the patient to be transported to the remote facility, as such the overall waiting and travel time is worsen off.

In some embodiments, in an inventory control system described in FIG. 3, the system may release a replacement machine to replace a machine in the system of machines when the number of machines that require maintenance exceeds a threshold, otherwise keep the machines operating. The system may determine an optimal threshold such that on average the machines requiring maintenance have the least waiting time plus service time. This threshold is critical in achieving an optimal performance. In one embodiment, the optimal performance can be indicating that the average number of machines waiting to be serviced was minimum when one or more decision rules were applied. If the system replaces the machines too late, fatal error rate of the system may be high, which is not desirable. On the other hand, if the system replaces the machines too frequent, it would be unnecessary waste of resources.

Figure 4:
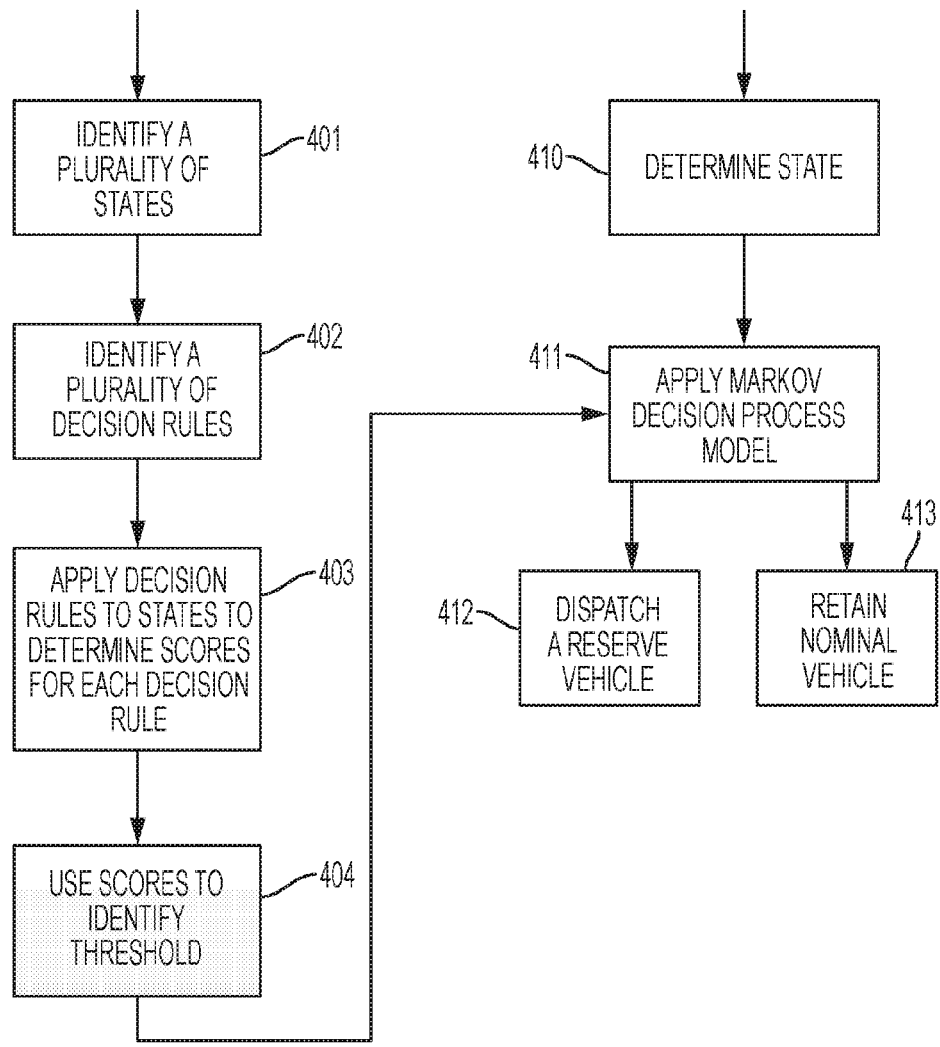
FIG. 4 depicts a diagram of applying a Markov Decision Process model in a vehicle dispatching system according to one embodiment.

With reference to FIG. 4, in one embodiment, in a public transportation network, the vehicle dispatch system may apply a Markov Decision Process (MDP) model by identifying a plurality of states of the public transportation network 401, identifying a plurality of decision rules 402, applying the decision rules to the plurality of states and determining a score for each of the decision rules 403, using the scores to identify a threshold 404. In one embodiment, each state of the public transportation network may include a time interval and a number of passengers waiting at the stop in the time interval. In one embodiment, each decision rule in the MDP model may be indicative of whether to dispatch a reserve vehicle or to keep using a nominal vehicle during any of the states. In one embodiment, each of the scores for each of the decision rules may represent a number of passengers waiting at the stop at the end of the time interval for the state to which the decision rule is applied. In one embodiment, the threshold may be indicative of the number of waiting passengers, at which the system should dispatch a reserve vehicle during a future time interval such that on average people have the least waiting time plus the commute time.

With further reference to FIG. 4, the system may use the information received from the passenger monitoring system to determine a state at an instant of time 410, determine whether a reserve vehicle should be dispatched after the instant of time by applying the MDP model to the determined state 411, and cause the vehicle dispatch system to dispatch a reserve vehicle after the instant of time 412 if the Markov Decision Process model for the determined state indicates that a reserve vehicle be dispatched, otherwise cause the vehicle dispatch system to retain a nominal vehicle without dispatching a reserve vehicle 413.

The embodiments described in FIG. 4 may also be applied to the patient admission control network described in FIG. 2. In one embodiment, each state of the patient admission control network may include a time interval and a number of patients waiting to be admitted in the time interval. In one embodiment, each decision rule in the MDP model may be indicative of whether to direct any patient to a remote facility or to direct the patient to continue waiting at the original facility where that patient has firstly arrived, during any of the states. In one embodiment, each of the scores for each of the decision rules may represent the number of patients waiting at the facility at the end of the time interval for the state to which the decision rule is applied. In one embodiment, the threshold may be indicative of the number of patients waiting in the queue, above which the system may direct the patient at the end of the patient queue, i.e. the patient who lastly comes, to a remote healthcare facility during a future time interval such that on average the patients have the least waiting time plus the travel time to the other facilities.

With further reference to FIG. 4, the system may use the information received from the patient monitoring system to determine a state at an instant of time 410, determine whether a reserve vehicle should be dispatched after the instant of time by applying the MDP model to the determined state 411, and cause the patient admission control system to direct the patient at the end of the patient queue to a remote healthcare facility after the instant of time if the MDP model for the determined state indicates that a patient be directed to another facility, otherwise cause the patient admission control system to direct the patients to continue waiting at the original facility.

The embodiments described in FIG. 4 may also be applied to the inventory control system described in FIG. 3. In one embodiment, each state of the inventory control system may include a time interval and a number of machines requiring maintenance in the time interval. In one embodiment, each decision rule in the MDP model may be indicative of whether to dispatch a replacement machine from the replacement machine inventory to replace a machine in the system of machines or keep the system of machines to continue operating, during any of the states. In one embodiment, each of the scores for each of the decision rules may represent a number of machines requiring maintenance at the end of the time interval for the state to which the decision rule is applied. In one embodiment, the threshold may be indicative of the number of machines waiting in the queue, above which the system may determine to replace the machine at the beginning of the queue, i.e. the machine which requests maintenance at the earliest time, by a replacement machine during a future time interval such that on average the machines have the least waiting time plus the service time. The service time may include the time required to ship the replacement machine and to install the replacement machine.

With further reference to FIG. 4, the system may use the information received from the sensor circuit (308 in FIG. 3) to determine a state at an instant of time 410, determine whether a replacement machine should be dispatched after the instant of time by applying the MDP model to the determined state 411, and cause the inventory control system to dispatch a replacement machine to replace the machine at the beginning of the queue after the instant of time if the MDP model for the determined state indicates that a replacement machine be dispatched, otherwise cause the inventory control system not to dispatch any replacement inventory.

Figure 5:
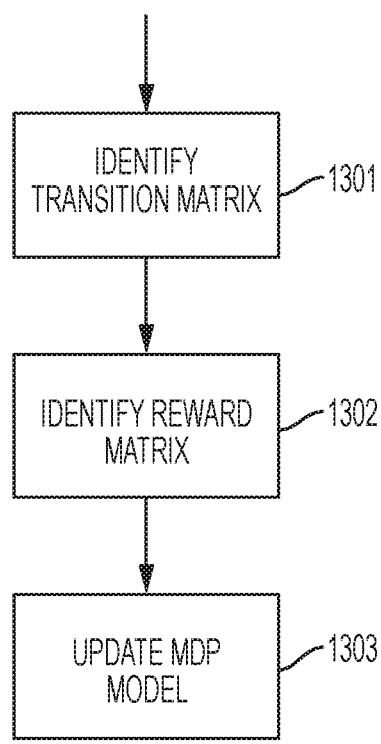
FIG. 5 depicts a diagram of updating a Markov Decision Process model in a vehicle dispatching system according to one embodiment.

With reference to FIG. 5, in one embodiment, in determining the scores for each of the decision rules and identifying the threshold, the system may identify a transition probability matrix indicative of probabilities between state transitions 1301, identify a reward matrix indicative of rewards between state transitions 1302, and update the MDP model 1303. In one embodiment, in the vehicle dispatching system described in FIG. 1, the system may update the MDP model using the monitored number of passengers waiting at the stop during a plurality of time intervals to maximize an average reward over that time interval. The reward for an action, such as dispatching a reserve vehicle, can be the reduction in the number of passengers waiting at the stop. In another embodiment, in the patient admission control system described in FIG. 2, the system may update the MDP model using the monitored number of patients waiting in the queue during a plurality of time intervals to maximize an average reward over that time interval. The reward for an action, such as directing a patent to a remote healthcare facility, can be the reduction in the number of patients waiting to be treated. In another embodiment, in the inventory control system described in FIG. 3, the system may update the MDP model using the number of machines requiring maintenance in a queue that is obtained from the sensor circuit during a plurality of time intervals to maximize an average reward over that time interval. The reward for an action, such as replacing or repairing, can be the negative of the cost incurred to either replacing the machine or repairing the machine, and the reward for doing nothing can be zero.

In updating the MDP model, in one embodiment, the system may use a pUCB technique based on (risk adjusted) maximum likelihood. In another embodiment, the system may use a pThompson technique based on Bayes rule. In another embodiment, the system may use a warmPSRL technique that uses either pUCB-based or pThompson-based algorithm to warm start the PSRL scheme. The applications of pUCB and pThompson techniques to the public transportation system 100 (in FIG. 1) will be further explained with reference to FIGS. 6, 7 and 8.

In FIG. 6, the pUCB-based algorithm is shown. In one embodiment, the input to the algorithm can be the number of people waiting at the stop in the first time interval of operation. The output of the algorithm is a decision, at each time interval (or each round), to use one of the reserve vehicles or the nominal vehicles to ferry passengers. In another embodiment, the input to the algorithm can be the number of patients waiting at a facility in the first time interval. The output of the algorithm is a decision, at each time interval (or each round), to direct the patient at the end of the patient queue to a remote facility or keep the patient in the queue to continue waiting at the initial facility where they have first arrived. In another embodiment, the input to the algorithm can be the number of machines requiring maintenance and waiting to be replaced in a system of machines in the first time interval. The output of the algorithm is a decision, at each time interval (or each round), to use one of the replacement machines or not to dispatch any of the replacement machines.

In one embodiment, the system may assume that the maximum number of passengers that can wait at the stop, or the maximum number of patients that can wait at the facility, or the maximum number of machines waiting to be serviced is K (say 100). The system may start considering all policies that have the same structure as the optimal policy, and denote the number of such policies as K. These K policies are known in advance.

In one embodiment, the system may treat these policies $\{\pi_k: k=1, \ldots, K\}$ as K arms of a "multi-arm bandit problem." This set of K policies along with a start state $s_{start}$, the number of rounds T, parameters $\tau$ (the length of episode) and $\{\beta(t)\}_{t=1 \ to \ T}$ are provided as input to the pUCB-based algorithm. An episode is the number of time steps for the system to return back to the same state that it started at. For example, in the public transportation setting, an episode is the number of time intervals taken to come back to the same number of passengers at a stop, given stochastic arrivals of people as well as the control policy (determined for instance using pUCB). The length of an episode is thus a number between 1 to T. It is a time bound on the actual episodes that occur in the system. In one embodiment, each episode may be divided into multiple time steps. At the start of the algorithm a random policy is decided to be followed in the episode. After an episode starts, the system may keep track of the total reward collected r (see Line 24) and the number of time steps elapsed t' (Line 25) before one of the termination conditions is satisfied. The termination condition (Line 14) may be (1) the time steps in the episode is equal to $\tau$; or (2) the system has reached the start state $s_{start}$. When the termination condition is satisfied, the system may end the episode (Line 22).

With further reference to FIG. 6, the system may maintain an estimate of the long-run average reward obtained under each policy $\pi_k$ as $\hat{\rho}(k)$. At the end of an episode, the system may update $\hat{\rho}(k)$ using r and t in a manner as shown in Line 15-17. In the next episode, the system may follow the policy that has the highest value, of the sum of the average reward estimate) $\hat{\rho}(k)$ and the confidence bonus $$\beta(t)\sqrt{\frac{2\log t}{n(k)}}$$

(Lines 20), where n(k) is used to track the count of the number of times policy k has been picked by round t (Line 19). The sequence $\{\beta(t)\}_{t=1 \ to \ T}$ is an input to the algorithm that determines the exploration-exploitation tradeoff as a function of time. In one embodiment, the parameter $\tau$ can be set to $\infty$, to ensure that the estimate $\hat{\rho}(k)$ will remain unbiased. When $\tau=\infty$, the system can only switch between policies at the end of recurrent cycles, i.e. the episode cycle, which is the number of time steps needed for the system to come back to the starting state. Mean recurrence times may potentially be large and are dependent on the unknown transition probabilities and the current policy being used. If they are indeed large, then $\tau$ can may lead the system to switch between policies at the expense of getting biased estimates of $\rho(\pi)$. On the other hand, if they are small relative to $\tau$, then setting $\tau$ to a finite value does not affect the estimation quality. In one embodiment, $\tau$ is set to $\infty$ to ensure unbiased estimates.

The applications of embodiments described in FIG. 6 in the context of a vehicle dispatching system or patient admission control system are further explained. In one embodiment, in the vehicle dispatching system, the $\rho(k)$, Line 5, can be a number that assigns a score to the decision of using the reserve vehicle in addition to the nominal vehicle when the number of passengers waiting at the stop is k. This decision rule can also be called policy $\pi_k$ for simplicity. In another embodiment, in the patient admission control system, the $\rho(k)$, Line 5, can be a number that assigns a score to the decision of using another healthcare facility in addition to the original facility when the number of patients waiting for care at the current facility is k.

With further reference to FIG. 6, the n(k), Line 6, can be a number that counts the number of times the corresponding decision rule/policy $\pi_k$ was used, and it may get updated after each time interval. In one embodiment, the maximum value it can take is the number of time intervals for which the system operates, e.g. T. Additionally, $R_{arm}(k)$, Line 7, can be the running sum of rewards for decision-rule/policy $\pi_k$ and $T_{arm}(k)$, Line 8, can be the running sum of number of rounds for policy $\pi_k$. As previous described, a reward is the reduction in the number of passengers waiting given the action when the decision rule is applied, such as the dispatching of a reserve vehicle. The running sum of rewards can be the average reduction of waiting time (proportional to the average number of passengers waiting), where the average is over the randomness in passenger arrivals.

With further reference to FIG. 6, Line 10, in one embodiment, state s may be the context or the situation prevailing at a given time interval. For example, in a vehicle dispatching system, the situation can be that both buses (the nominal and the reserve) are being used and the number of passengers waiting is 10. In this situation, the system may not assign any passengers to any of the buses. In another example, the nominal bus is being used and the reserved bus is not being used and the number of passengers waiting is 50. The system may invoke policy $\pi_{50}$ and start dispatching the reserve bus, or it may invoke policy $\pi_{100}$ and not use the reserve bus and keep the 50 passengers waiting. In another example, in a patient admission control system, the situation can be that resource/staff at both original and remote healthcare facilities are busy and the number of patients waiting is 10, under which situation the system may not direct any patients to any other facilities. In another example, the initial facility is busy but a remote facility is not busy and the number of patients waiting is 50. The system may invoke policy $\pi_{50}$ and start directing patients to the remote facility, or it may invoke policy $\pi_{100}$ and not direct patients to the remote facility but keep the 50 patients waiting at the initial facility.

With further reference to FIG. 6, Line 11, the system may pick a random decision rule between 1 and K initially. In updating the MDP model, in each of the time intervals, Line 13, the system may update how the rule is performing. For example, the system may count $R_{arm}(k)$ to score the currently deployed decision rule, and count $T_{arm}(k)$ to score how many time intervals the same decision rule k has been applied, and update $\rho(k)$ as the ratio of $R_{arm}(k)$ and $T_{arm}(k)$, Line 17. The system may also identify which decision rule to change in a procedure described in Lines 18-21, under which the rule that achieves the maximum performance is identified, Line 20. In one embodiment the performance in the vehicle dispatching system may be the number of passengers waiting. In another embodiment, the performance in the patient admission control system may be the number of patients waiting.

With further reference to FIG. 6, after a decision is taken, such as whether to dispatch a reserve bus in the vehicle dispatching system or whether to direct the patient to a remote facility in the patient admission control system, the system may change the state probabilistically, Line 24.

With reference to FIG. 7, the pThompson-based algorithm is shown. In structure, inputs and outputs of the pThompson-based algorithm are similar to the embodiments described in FIG. 6, except that it does not have the sequence $\{\beta(t)\}_{t=1\ to\ T}$ as one of its inputs. The initialization is similar to that of the pUCB-based algorithm except that pThompson-based algorithm maintains a different set of internal estimates. In particular, for each policy $\pi_k$, it maintains two estimates $S(k)$ and $F(k)$. These two estimates parameterize a Beta distribution that encodes the beliefs on the average cost reward of policy $\pi_k$. During each episode, the system may keep track of the total reward collected r (Line 23) and the number of rounds t elapsed (Line 24) before any of the termination conditions is met (Line 12).

In one embodiment, the system may add the cumulative reward for the episode r to the running estimate $S(k)$ of the current policy k (Line 14) and update $F(k)$ by t−r (Lines 14, 15). This update step is critical in that it ensures that the mean of the Beta distribution is an unbiased estimate of average reward $\rho(k)$. This is different from the update step in known Thompson sampling, in that the updates also rely on conjugacy properties. In one embodiment, for new policy selection, the system may draw a realization for each of the K Beta distributions and pick that policy whose realization value is the highest.

The pUCB- and pThompson-based algorithms disclosed in embodiments in FIGS. 6 and 7 differ from known UCRL and PSRL algorithms, in that known UCRL and PSRL algorithms generally maintain $O(M^2N)$ estimates internally, whereas the pUCB- and pThompson-based algorithms disclosed in FIGS. 6-7 typically maintain $O(M)$ estimates, thus the calculation runs faster on a processing device. Further, the pUCB- and pThompson-based algorithms do not incur high sampling costs that are inherently necessary for PSRL. For example, in PSRL, the system needs to sample $O(M^2N)$ transition probability values and reward values from a belief that the system maintains. Without using conjugacy, belief updates also become expensive to compute. The pUCB- and pThompson-based algorithms are not merely regret minimization algorithms but are in fact model-free RL algorithms. That is, they learn the average cost of the input policies directly instead of learning models for the transition probabilities and reward values.

With reference to FIG. 8, alternatively and/or additionally, the system may use a warmPSRL algorithm, in which the system may use the pUCB- and the pThompson-based algorithms in conjunction with algorithms such as PSRL to further improve on the cumulative rewards collected. The estimates from the pUCB or pThompson can be used to warm start the PSRL. In other word, the algorithm requires an additional input $T_{switch}$ that is chosen depending on problem instance. For the initial $T_{switch}$ rounds, the system may run modified versions of pUCB or pThompson (pUCB-Extended and pThompson-Extended respectively) or any other bandit algorithm, in which the system may empirically estimate transition probabilities and rewards in parallel. For $T-T_{switch}$, Line 5, the system may run the PSRL algorithm with the estimates computed by embodiments in FIGS. 6 and 7, as the initialization values. The warmPSRL is a combination of model free and model based methods.

Alternatively and/or additionally, instead of providing $T_{switch}$ as an input, the system may terminate the bandit algorithm (Line 4) used in warmPSRL implicitly when the estimates on the transition probabilities and reward values converge (to within a pre-specified value).

Figure 9:
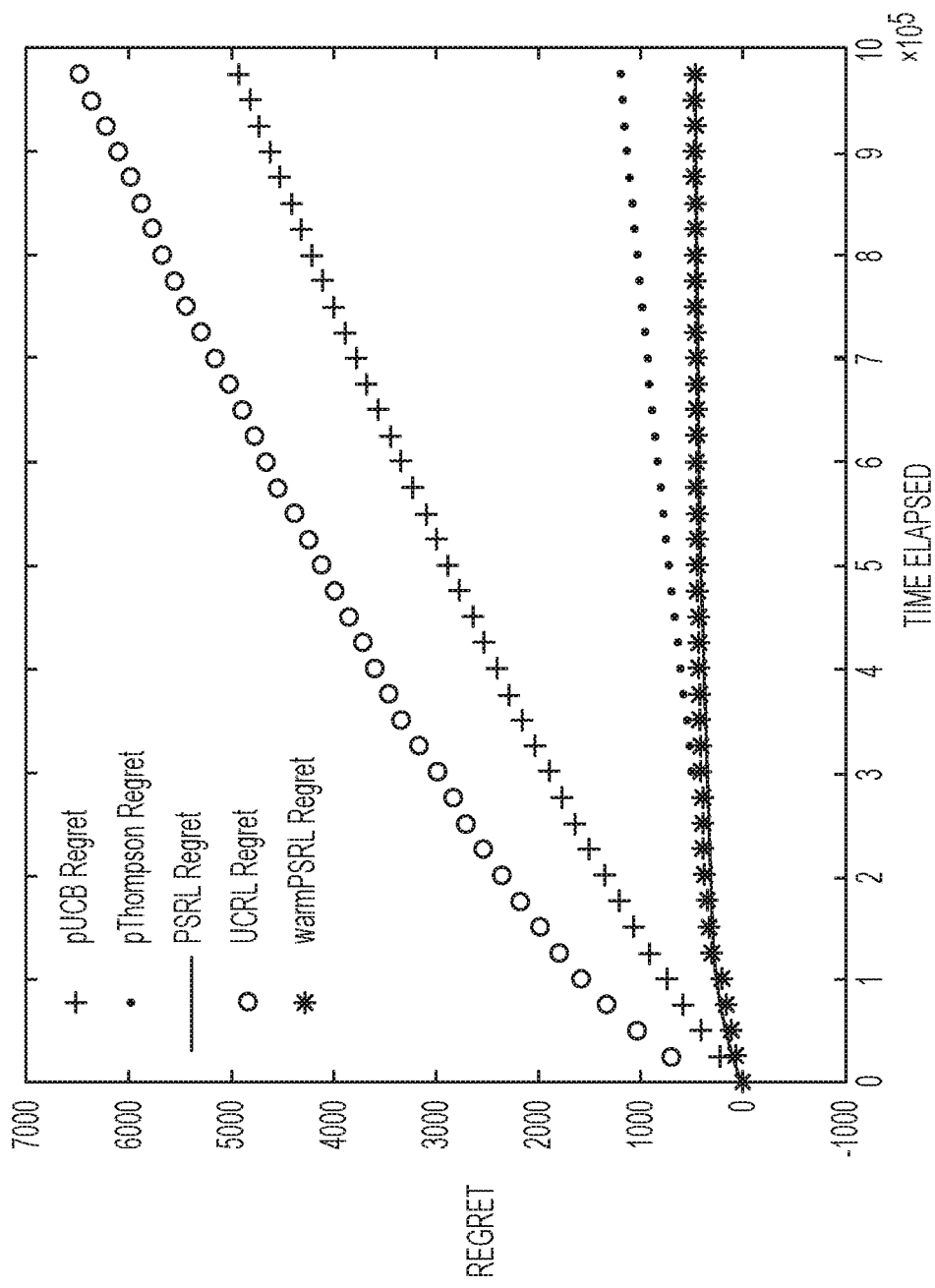
FIG. 9 depicts examples of simulation results in some experiments according to some embodiments.

With reference to FIG. 9, experiments are conducted to show the regret as a function of the number of rounds for the problem of machine replacement. Consider the problem of operating a machine efficiently. The machine can be in one of n possible states ($S=\{1, 2, \ldots, n\}$). Let state 1 correspond to the machine being in perfect condition and each subsequent state correspond to increasingly deteriorated condition of the machine. Let there be an average cost $g(i)$ for operating the machine for one time period when it is in state i. Because of the increasing failure probability, it is assumed that $g(1) \leq g(2) \leq \ldots \leq g(n)$. Two actions are taken in each state: continue operating the machine without maintenance (C) or perform maintenance (PM). Once maintenance has been performed, the machine is guaranteed to remain in state 1 for one time period. The cost for maintenance is thus the sum of R (for repairing) and $g(1)$ (because the machine is now functioning in state 1).

Let $P=[[p_{ij}(a)]]$, i, $j \in S$, $a \in \{C, PM\}$ denote the transition probability matrix, with the following properties: (a) $p_{i1}(PM)=1$, (b) $p_{ij}(PM)=0$, for all $j \neq 1$, (c) $p_{ij}(C)=0$, for all $j<i$, and (d) $p_{ij}(C) \leq p_{(i+1)j}(C)$, for all $j>i$. Intuitively, when the machine is operated in state j, its well-being will deteriorate to another state $i \geq j$ after the current time period. For the machine replacement problem, and many others based on it, the optimal policy can be a threshold policy if an objective is to minimize the average cost of using the machine. That is, the system should determine to perform maintenance if and only if the state of the machine $i \geq i^*$, where $i^*$ is a certain threshold state. The system may identify this threshold state if the precise transition probability values are known.

In configuring the experiments, the number of states is chosen to be 100. Ten Monte Carlo simulations are run. The true transition probability values are generated randomly (taking into account the constraints relating these values) and are kept fixed for each simulation run, each having $10^6$ rounds. The start state corresponds to the state where the machine is in perfect condition. The parameter $\tau$ was set to $\infty$ for pUCB and pThompson. Further, $\beta(t)$ was set to 1 for pUCB. In warmPSRL, the system is configured to use pThompson for 10 rounds, estimate (P, R) and then switch to PSRL with the estimated (P, R) as the starting values for the remaining rounds. Appropriate best values are chosen for PSRL and UCRL parameters as well.

In FIG. 9, the resulting regret achieved by the algorithms disclosed in FIGS. 6-8 and their comparison to the known PSRL and UCRL algorithms are shown. In this experiment, the regret of warmPSRL is very close to that of PSRL overall and better in the initial rounds. However, warmPSRL ran significantly faster than PSRL because the warmPSRL does not incur as high sampling cost as PSRL. In this experiment, warmPSRL also performs better than pUCB and pThompson.

Figure 10:
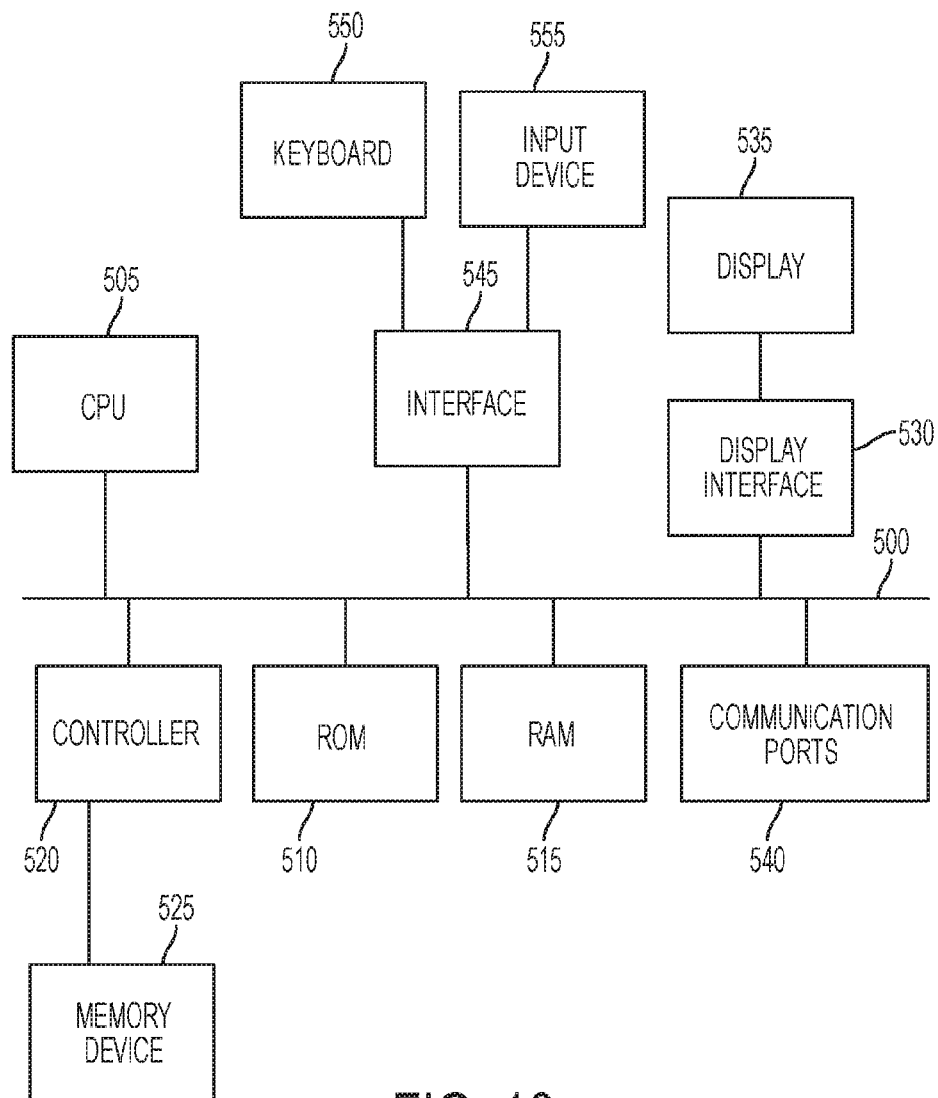
FIG. 10 depicts various embodiments of one or more electronic devices for implementing the various methods and processes described herein.

FIG. 10 depicts an example of internal hardware that may be included in any of the electronic components of the system, such as the processing device, the passenger monitoring system, the patient monitoring system, the token reader, the sensor device for the inventory control management system, the vehicle dispatching system, patient admission control system or the inventory control system in the embodiments described in FIGS. 1-3. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors, whether a central processing unit (CPU) or a graphics processing unit (GPU) or a combination of the two. Read only memory (ROM), random access memory (RAM), flash memory, hard drives and other devices capable of storing electronic data constitute examples of memory devices 525. A memory device may include a single device or a collection of devices across which data and/or instructions are stored.

An optional display interface 530 may permit information from the bus 500 to be displayed on a display device 535 in visual, graphic or alphanumeric format. An audio interface and audio output (such as a speaker) also may be provided. Communication with external devices may occur using various communication devices 540 such as a transmitter and/or receiver, antenna, an RFID tag and/or short-range or near-field communication circuitry. A communication device 540 may be attached to a communications network, such as the Internet, a local area network or a cellular telephone data network.

The hardware may also include a user interface sensor 545 that allows for receipt of data from input devices 550 such as a keyboard, a mouse, a joystick, a touchscreen, a remote control, a pointing device, a video input device and/or an audio input device. Digital image frames also may be received from an imaging capturing device 555 such as a video or camera positioned over a surgery table or as a component of a surgical device. For example, the imaging capturing device may include imaging sensors installed on a robotic surgical system. A positional sensor and motion sensor may be included as input of the system to detect position and movement of the device.

In implementing the training on the aforementioned hardware, in one embodiment, the entire training data may be stored in multiple batches on a computer readable medium. Training data could be loaded one disk batch at a time, to the GPU via the RAM. Once a disk batch gets loaded onto the RAM, every mini-batch needed for SGD is loaded from RAM to GPU and this process repeats. After all the samples within one disk-batch are covered, the next disk batch is loaded onto the RAM and this process repeats. Since loading data each time from disk to RAM is time consuming, in one embodiment, multi-threading can be implemented for optimizing the network. While one thread loads a data batch, the other trains the network on the previously loaded batch. In addition, at any given point in time, there is at most one training and loading thread, since otherwise multiple loading threads will clog the memory.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for dispatching vehicles in a public transportation network, comprising:
 a monitoring system configured to monitor a number of passengers waiting at a stop in a public transportation network;
 a vehicle dispatching system;
 a processing device communicatively coupled to the monitoring system; and
 a non-transitory computer readable medium in communication with the processing device, the computer readable medium storing one or more programming instructions for causing the processing device to:
  apply a Markov Decision Process model by:
   identifying a plurality of states of the public transportation network, in which each state comprises a time interval and a number of passengers waiting at the stop in the time interval,
   identifying a plurality of decision rules, wherein each decision rule is indicative of whether to dispatch a reserve vehicle or to keep using a nominal vehicle during any of the states,
   applying the decision rules to a plurality of states and determining a score for each of the decision rules, in which each score represents a number of passengers waiting at the stop at the end of the time interval for the state to which the decision rule is applied, and
   using the scores to identify a number of waiting passengers at which a reserve vehicle should be dispatched during a future time interval;
  receive information from the monitoring system and use the received information to determine a state at an instant of time;
  determine whether a reserve vehicle should be dispatched after the instant of time by applying the Markov Decision Process model to the determined state; and
  cause the vehicle dispatching system to dispatch a reserve vehicle after the instant of time if the Markov Decision Process model for the determined state indicates that a reserve vehicle be dispatched, otherwise cause the vehicle dispatch system to retain a nominal vehicle without dispatching a reserve vehicle.

2. The system of claim 1, wherein:
 the monitoring system comprises a camera that is positioned at the stop; and
 the one or more programming instructions comprise additional programming instructions that are configured to cause the processing device to:
  receive, from the camera, a sequence of video frames of the stop; and
  identify the number of passengers waiting at the stop based on the sequence of video frames.

3. The system of claim 1, wherein:
 the monitoring system comprises a token reader that is positioned at the stop; and
 the one or more programming instructions comprise additional programming instructions that are configured to cause the processing device to receive, from the token reader, a measured indication of a number of passengers who bore tokens and who passed within a detectable communication range of a receiver of the token reader.

4. The system of claim 1, in which the instructions to apply the decision rules to a plurality of states and determine the scores for each of the decision rules comprise instructions to:
 identify a transition probability matrix indicative of probabilities between state transitions;
 identify a reward matrix indicative of rewards between state transitions; and update the Markov Decision Process model using the monitored number of passengers waiting at the stop during a plurality of time intervals to maximize an average reward over that time interval.

5. The system of claim 4, in which the instructions to determine a score for each of the decision rules comprise instructions to determine a running sum of a group of rewards for each decision rule over a plurality of time periods.

6. The system of claim 5, wherein each reward of the group of rewards is indicative of a reduction in the number of passengers waiting at the stop when each decision rule is applied.

7. The system of claim 4, wherein the instructions to determine the running sum of a group of rewards for each decision rule over the plurality of time periods comprises instructions to:
   identify one or more time periods for which the decision rule achieves a maximum performance among all of the plurality of decision rules, wherein the performance indicates that an average number of passengers waiting at the stop was reduced when the decision rule is applied; and
   determine the plurality of time intervals based on the identified one or more time periods.

8. The system of claim 1, in which the instructions to determine the score for each of the decision rules comprise instructions to determine a cumulative reward over a plurality of time intervals.

9. The system of claim 8, wherein the cumulative reward is indicative of a reduction in the number of passengers waiting when each decision rule is applied.

10. The system of claim 8, in which the instructions to determine the cumulative reward comprise instructions to:
    identify one or more time periods for which the decision rule achieves a maximum performance among all of the plurality of decision rules, wherein the performance is based on a belief on an average cost reward under the decision rule; and
    determine the plurality of time periods based on the identified one or more time periods.

11. A method of dispatching vehicles in a public transportation network, comprising:
    monitoring, by a monitoring system, a number of passengers waiting at a stop in a public transportation network;
    applying, by a processing device, a Markov Decision Process model by:
        identifying a plurality of states of the public transportation network, in which each state comprises a time interval and a number of passengers waiting at the stop in the time interval,
        identifying a plurality of decision rules, wherein each decision rule is indicative of whether to dispatch a reserve vehicle or to keep using a nominal vehicle during any of the states,
        applying the decision rules to a plurality of states and determining a score for each of the decision rules, in which each score represents a number of passengers waiting at the stop at the end of the time interval for the state to which the decision rule is applied, and
        using the scores to identify a number of waiting passengers at which a reserve vehicle should be dispatched during a future time interval;
    receiving, by the processing device, information from the monitoring system and using the received information to determine a state at an instant of time;
    determining, by the processing device, whether a reserve vehicle should be dispatched after the instant of time by applying the Markov Decision Process model to the determined state; and
    dispatching, by a vehicle dispatching system, a reserve vehicle after the instant of time if the Markov Decision Process model for the determined state indicates that a reserve vehicle be dispatched, otherwise retaining a nominal vehicle without dispatching a reserve vehicle.

12. The method of claim 11, wherein:
    the monitoring system comprises a camera; and
    monitoring the number of passengers at the stop comprises:
        receiving, by the processing device from the camera, a sequence of video frames of the stop, and
        identifying the number of passengers waiting at the stop based on the sequence of video frames.

13. The method of claim 11, wherein:
    the monitoring system comprises a token reader positioned at the stop; and
    monitoring the number of passengers at the stop comprises:
        receiving, by the processing device from the token reader, a measured indication of a number of passengers who bore tokens and who passed within a detectable communication range of a receiver of the token reader.

14. The method of claim 11, wherein applying the decision rules to a plurality of states and determining the scores for each of the decision rules comprise:
    identifying, by the processing device, a transition probability matrix indicative of probabilities between state transitions;
    identifying, by the processing device, a reward matrix indicative of rewards between state transitions; and
    updating, by the processing device, the Markov Decision Process model using the monitored number of passengers waiting at the stop during a plurality of time intervals to maximize an average reward over that time interval.

15. The method of claim 14, in which determining the scores for each of the decision rules comprises determining a running sum of a group of rewards for each decision rule over a plurality of time periods.

16. The method of claim 15, wherein each reward of the group of rewards is indicative of a reduction in the number of passengers waiting at the stop when each decision rule is applied.

17. The method of claim 14, wherein determining the running sum of a group of rewards for each decision rule over the plurality of time periods comprises:
    identifying, by the processing device, one or more time periods for which the decision rule achieves a maximum performance among all of the plurality of decision rules, wherein the performance indicates that an average number of passengers waiting at the stop was reduced when the decision rule is applied; and
    determining the plurality of time periods based on the identified one or more time periods.

18. The method of claim 11, in which determining the score for each of the decision rules comprises determining a cumulative reward over a plurality of time intervals.

19. The method of claim 18, wherein the cumulative reward is indicative of a reduction in the number of passengers waiting when each decision rule is applied.

20. The method of claim 18, in which determining the cumulative reward comprises:

identifying one or more time periods for which the decision rule achieves a maximum performance among all of the plurality of decision rules, wherein the performance is based on a belief on an average cost reward under the decision rule; and determining the plurality of time periods based on the identified one or more time periods.

* * * * *